Oct. 28, 1969        B. L. HULLAND        3,475,683
METHOD AND APPARATUS FOR MEASURING SIGNAL TO NOISE RATIO
Filed Sept. 28, 1967        4 Sheets-Sheet 1
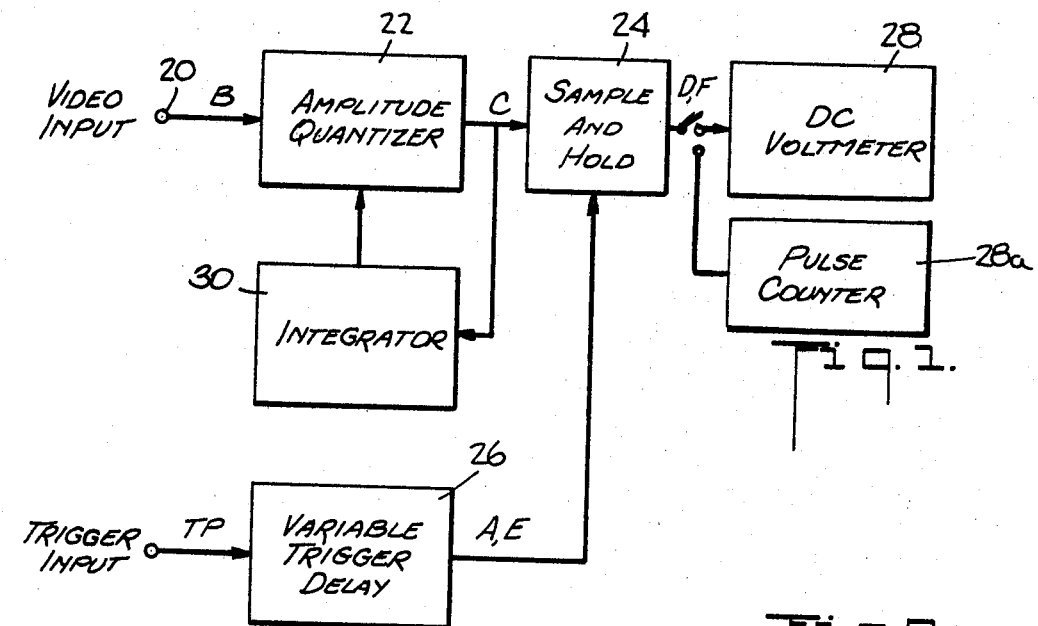
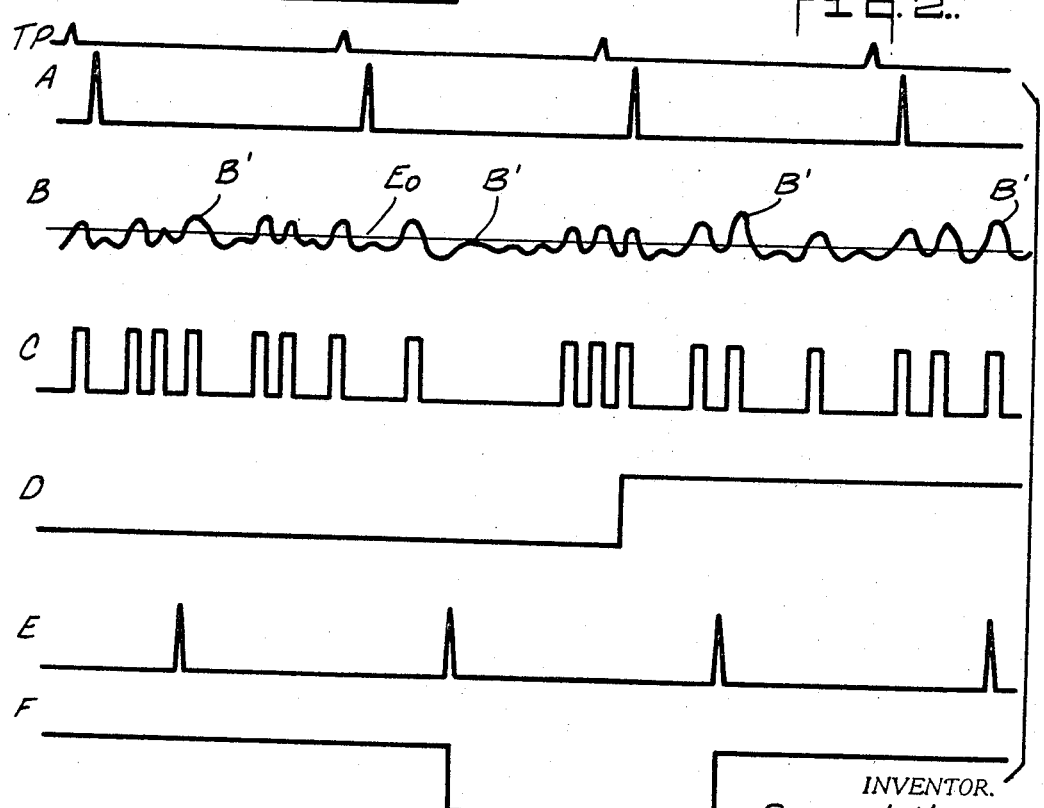
INVENTOR.
BURTON L. HULLAND
BY
*Kenyon & Kenyon*
ATTORNEY INVENTOR.
BURTON L. HULLAND
BY
Kenyon & Kenyon
ATTORNEYS

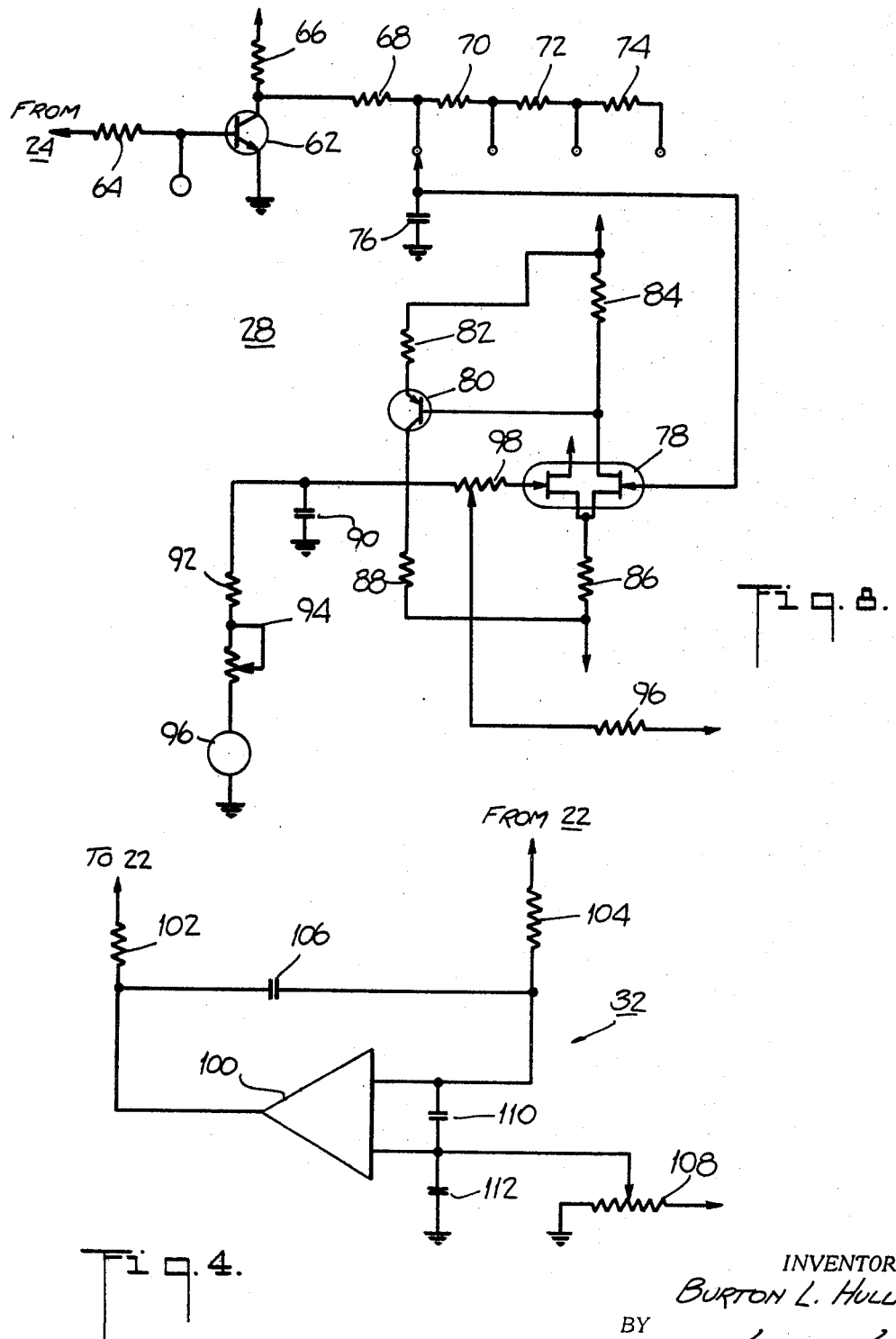

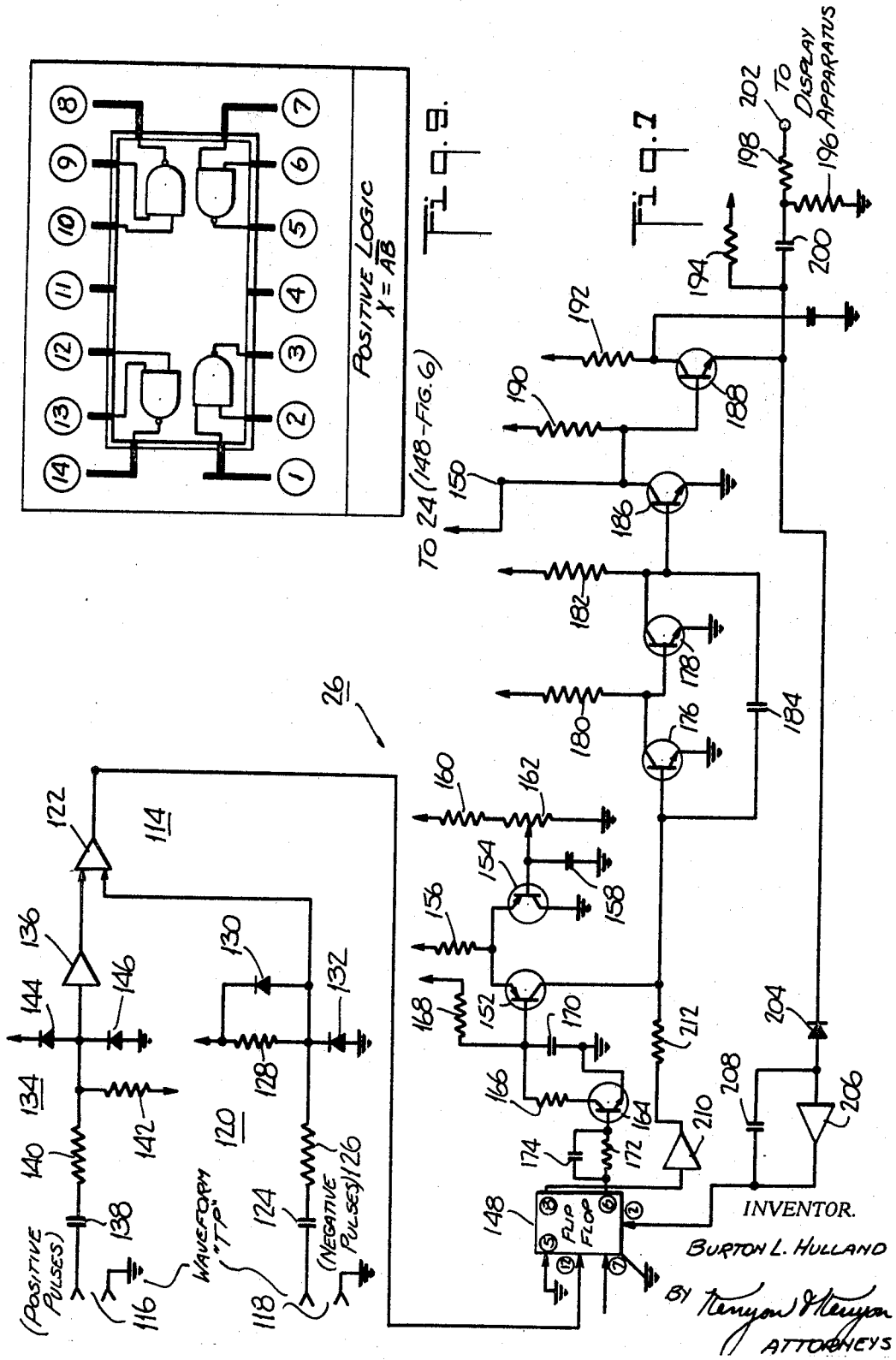

United States Patent Office 3,475,683
Patented Oct. 28, 1969

3,475,683
METHOD AND APPARATUS FOR MEASURING SIGNAL TO NOISE RATIO
Burton L. Hulland, Glenwood Landing, N.Y., assignor to Dynell Electronics Corporation, Plainview, N.Y., a corporation of New York
Filed Sept. 28, 1967, Ser. No. 671,406
Int. Cl. G01r 7/00, 27/00; H04b 1/00
U.S. Cl. 324—140                                11 Claims

ABSTRACT OF THE DISCLOSURE

The method and apparatus of the disclosure relate to the measurement of the ratio of information signal power to noise power of a detected electrical wave form. The measurement is made in terms of the known statistical characteristics of the detected wave form. In particular, the time rate at which the noise component of the detected wave form exceeds a pre-selected threshold level is measured by sampling the amplitude of the detected wave form at a sampling rate equal to the frequency of the information signal and during a period of time substantially greater than the period of the information signal component of a detected wave form. The time rate at which the information signal component of the wave form exceeds the pre-selected threshold is then measured in a similar manner. The measured rates are correlated with reference to the statistical functions which describe the characteristics of the detected wave form in order to determine the ratio of information signal power to noise power in the detected wave form.

BACKGROUND OF INVENTION

The field of the invention relates generally to methods and apparatus for measuring the ratio of information signal power to noise power of an electrical wave form which has known statistical characteristics.

More in particular, the field of the invention relates to methods and apparatus for measuring the ratio of information signal power to noise power of a detected electrical wave form in terms of the known statistical characteristics of the detected wave form.

Conventional methods and apparatus for measuring the ratio of signal power to noise power (SNR) of a received signal are undesirably dependent on precise knowledge and accurate adjustment of the characteristics of the signal receiving apparatus processing the signal such as the over-all sensitivity of the receiving apparatus, the detection law characteristics of the receiving apparatus, and the like.

In addition to the errors and inaccuracies normally arising from the use of conventional SNR measuring methods and apparatus, misalignment of the signal receiving apparatus also limits the precision with which SNR can be measured. Another difficulty is that although some SNR measuring methods and apparatus yield acceptable results when operating on a signal processed by one kind of detecting circuit, for example, an envelope detector, the same methods and apparatus can give inaccurate results when operating on a signal which is processed by another kind of detecting circuit, for example, a square law detector.

STATEMENT OF INVENTION

It is an object of the invention to provide a method of measuring the ratio of information signal power to noise power of an electrical wave form which has known statistical characteristics.

It is another object of the invention to provide a method of measuring the ratio of information signal power to noise of a detected electrical wave form in terms of the statistical functions which describe the time characteristics of the wave form.

It is still another object of the invention to provide a method for measuring the ratio of information signal power to noise power of a detected electrical wave form which is independent of the detection law characteristic of the apparatus receiving and processing the signal to be measured.

It is an additional object of the invention to provide a method of measuring the probability of detecting a periodic information signal immersed in noise which has known statistical characteristics in terms of a pre-selected probability of detecting the noise component of the wave form alone.

It is another object of the invention to provide apparatus for measuring the ratio of information signal power to noise power of an electrical wave form having known statistical characteristics.

Still another object of the invention is to provide an apparatus for measuring the ratio of information signal power to noise power of a detected electrical wave form in terms of the statistical functions which describe the time characteristics of the wave form.

It is a further object of the invention to provide an apparatus for measuring the ratio of information signal power to noise power of a detected electrical wave form, that functions independently of the detection law characteristic of the apparatus receiving and processing the signal to be measured.

It is still a further object of the invention to provide apparatus for measuring the probability of detecting a periodic information signal immersed in noise, that has known statistical characteristics, in terms of a pre-selected probability of detecting the noise component alone.

In accordance with the invention, a method of measuring the ratio of signal power to noise power of an electrical wave form in terms of the known statistical characteristics of the wave form includes the step of selecting a threshold level which is less than the peak excursions of the amplitude variations of the detected wave form. The method additionally includes the step of measuring the time rate at which the noise component, alone, of the wave form exceeds the threshold level and the step of measuring the time rate at which the signal component of the wave form superimposed on the noise component exceeds the threshold level. The method also includes the step of correlating the measured time rates to the known statistical characteristics of the wave form in terms of the statistical functions which describe the wave form. In this way the resulting correlation determines the ratio of signal power to noise power of the wave form.

DESCRIPTION OF DRAWINGS

Other objects and a more complete understanding of the invention are had by reference to the following description of embodiments and the claims taken in conjunction with the drawings in which:

FIG. 1 is a block diagram of one embodiment of electrical apparatus constructed in accordance with the invention, for measuring signal to noise ratio;

FIG. 2 shows in graphic form electrical wave forms useful to explain the operation of the apparatus shown in FIG. 1;

FIG. 4 is a schematic diagram of an integrator circuit that is incorporated in the electrical apparatus of FIG. 1;

FIG. 7 is a schematic of a variable trigger delay circuit that is also incorporated in the electrical apparatus of FIG. 1;

FIG. 8 shows a schematic of a DC voltmeter which is incorporated in the electrical apparatus of FIG. 1; and FIG. 9 shows, in block diagram form, an integrated circuit semi-conductor device which includes four inverter circuits forming a portion of the variable trigger delay circuit shown in FIG. 7.

DESCRIPTION OF EMBODIMENTS

Figure 3:
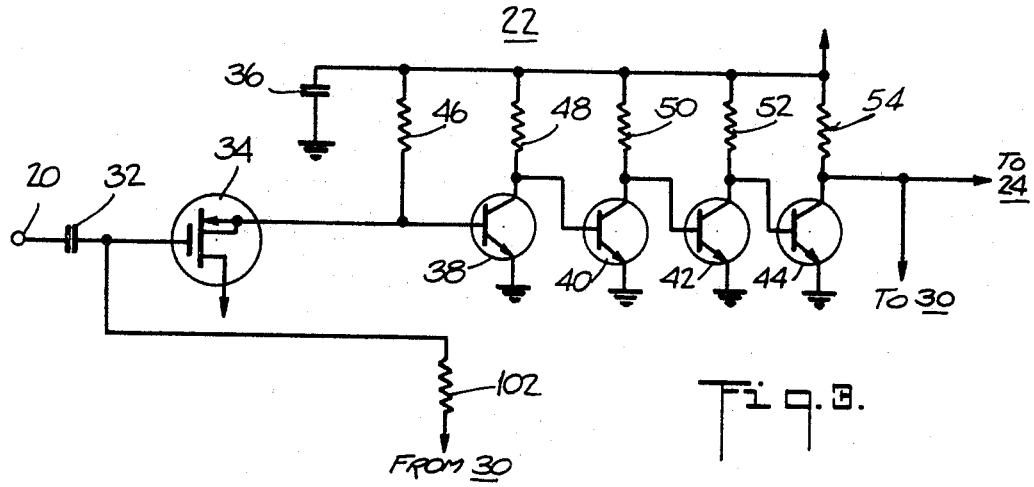
FIG. 3 is a schematic diagram of an amplitude quantizer circuit that is incorporated in the electrical apparatus of FIG. 1.

Applicant has discovered that the measurement of the ratio of signal power to noise power of a detected electrical wave form which has known statistical characteristics can be made independent of the operating characteristics of the wave form receiving apparatus for processing the wave form such as for example the detection law characteristic of the receiving apparatus, by making appropriate measurements with reference to an amplitude threshold level which is less than the peak-to-peak amplitude variations of the wave form.

Since the noise component in the wave form has a random amplitude at any instant of time, the threshold level can be adjusted to a value such that the rate at which the noise component alone exceeds the threshold during a selected period of time can be measured. The rate at which the information signal component of the wave form, superposed on the noise component, exceeds the threshold level during the selected period of time, can also be measured. The statistical functions which describe the time characteristics of the wave form are used to correlate the time rates which are measured with respect to threshold to determine the SNR.

In accordance with the method of the invention measurements are made of the percentage of the time that the noise component alone and the percentage of the time that the information signal component superposed on the noise component are above the same threshold and the measured percentages are then correlated to calculate the signal to noise ratio by applying the known statistical functions which describe the time characteristic of the wave form.

In one embodiment of apparatus constructed in accordance with the invention for measuring the SNR of a detected wave form, the percentage of time that the noise component, alone, exceeds the threshold level is electronically regulated at a chosen value. In this manner, one of the variables to be correlated in order to determine the SNR is held constant. The measurement of the percentage of time during which the information signal component superposed on the noise component exceeds the threshold level is electronically converted, by means of a suitably calibrated meter circuit, to SNR data.

One example of a detected electrical wave form processed by conventional signal receiving apparatus including a detector, whose SNR can be measured by the method and apparatus of the present invention, is a pulsed signal, such as a radar echo, in Gaussian white noise. A signal of this kind is shown as wave form B (FIG. 2), where B' represents the pulsed signal.

The probability that noise or signal plus noise exceeds a threshold is a function of the signal-to-noise ratio SNR. If the relations between probability of noise alone exceeding threshold $P_a$, probability of signal plus noise exceeding threshold $P_d$, and SNR are known, a DC voltage can be derived which is directly in terms of SNR, if $P_a$ or $P_d$ is fixed.

The percentage of time during which the noise component of this wave form exceeds a threshold level $E_o$ (FIG. 2) and produces a detector output is defined as the probability $P_a$. The percentage of time during which the information signal component superposed on the noise component exceeds the threshold level $E_o$ and produces a detector output is defined as the probability $P_d$. For an input consisting of a signal having an envelope equivalent to a sinusoid in Gaussian noise, the probability relations can be expressed as:

$$P_d = \int_{\sqrt{-2\ln P_a}}^{\infty} E_N \epsilon^{-\left[SNR + \frac{E_N^2}{2}\right]} I_0(E_N\sqrt{2(SNR)}) dE_N \quad (1)$$

$$P_a = \epsilon^{-\frac{E_o^2}{2}} \quad (2)$$

where:

$E_N$ is the envelope of the signal-plus-noise voltage normalized by RMS noise voltage;

$E_o$ is the normalized value of a preselected threshold voltage; and $$I_0[E_N\sqrt{2(SNR)}]$$

is a modified Bessel function of the first kind, zero order.

Equations of these types have been tabulated by J. I. Marcum as "Table of Q Functions," Rand Corporation Report RM-339, Jan. 1, 1950, ASTIA Document AD116551. Thus, the relations between $P_d$, $P_a$, and SNR hold not only for a linear envelope detector, but for any monotonic envelope detector, such as square law, logarithmic, or most practical diode detectors. This is an important advantage, in that the characteristic or law of the detector need not be known to use the SNR meter of the invention.

By measuring the probabilities $P_a$ and $P_d$ in the manner more fully described below graphical solutions of Equation 1 can be obtained to determine the SNR. In addition by measuring the probability $P_d$ for a pre-selected constant value of the probability $P_a$, the measurements can be electronically converted directly into SNR data. Apparatus for measuring the SNR in this manner is shown in FIG. 1.

Referring to FIG. 1, apparatus for measuring the ratio of information signal power to noise power of a detected electrical wave form, that has known statistical characteristics, includes a first means for supplying the detected wave form, for example, input terminal 20. The detected wave form can be a pulsed radar echo B' in Gaussian white noise (wave form B). The detected wave form B is converted to a binary voltage by an amplitude quantizer circuit 22. The binary voltage (wave form C) is used to set a sample-and-hold circuit 24 which is clocked by a delayed signal sampling signal (wave form E) supplied from a variable trigger delay circuit 26 having an input trigger pulse TP. The delayed sampling signal (wave form E) which is derived from a synchronizing trigger (wave form A) is synchronous in time with the information signal component (B') of the detected wave form (wave form B). The average value of the output voltage (wave form F) of the sample-and-hold circuit 24 is measured, during a period of time substantially greater than the period of the information signal component by a DC voltmeter circuit 28.

A noise sampling pulse A delayed in time phase with respect to the trigger pulse TP is supplied by the variable trigger delay circuit 26 and this delayed sampling signal (wave form A) is used to clock the sample-and-hold circuit 24. The average value of the output voltage (wave form D) of the sample-and-hold circuit 24 is measured during a period of time substantially greater than the period of the information signal component by the DC voltmeter circuit 28.

Since the average value of the output voltage of the sample-and-hold circuit 26 under the above conditions is proportional to the probabilities $P_d$ and $P_a$, respectively, the numerical value of these probabilities can be read from the voltmeter scale and converted to SNR data by means of Equations 1, 2.

The meter can also be used to measure the SNR of other waveforms, if their statistical characteristics are known, and if the meter scale is suitably calibrated, or $P_d$ and $P_a$ can be measured, and SNR determined from graphs, tables, or analytical relations. Among other waveforms are a DC signal in Gaussian noise, a fluctuating signal in noise, or a sinusoidal signal in noise, without envelope detection. The latter can have its SNR measured if it is sampled at the peaks of the sinusoid with the clock pulse. Then it is equivalent to sampling a DC signal in noise. Similarly, the SNR of a nonsinusoidal but periodic signal can be measured.

By coupling the output of the amplitude quantizer circuit 22 (wave form C) to an integrator circuit 30, the average value thereby developed of the output of circuit 22 can be used electronically to regulate the threshold $E_o$, thereby holding the probability $P_a$ constant. The DC voltmeter circuit 28 can then be calibrated directly to provide SNR data readings, from the meter in response to the measurement of the average value of the output voltage of the sample-and-hold circuit 24, that is clocked by a sampling signal synchronous in time with the information signal component (wave form E).

Referring to the component parts of the apparatus of FIG. 1 in greater detail, the amplitude quantizer circuit 22 can be a Schmitt trigger circuit which has one of two output levels (wave form C) depending on whether the input voltage (wave form B) is above or below the threshold value ($E_o$).

Alternatively the amplitude quantizer circuit 22 can be the circuit shown in FIG. 3. The detected electrical wave form (wave form B) is supplied from input terminal 20 through a coupling capacitor 32 to a transistor 34, that has a high input impedance. The output of amplifier 34 is coupled to a saturating or signal squaring amplifier comprising transistors 38, 40, 42, and 44, resistors 46, 48, 50, 52, 54 coupled to a DC power supply, and a bypass capacitor 36. The output of the signal squaring amplifier (wave form C) is coupled to the sample-and-hold circuit 24 and also to the integrator circuit 30. The output of the integrator circuit 30 is coupled to the input of amplifier 34 through resistor 102 and thereby regulates the threshold voltage ($E_o$) of the signal squaring amplifier.

The integrator circuit 30 can comprise a smoothing capacitor, or alternatively the operational amplifier 100, including a feed-back capacitor 106, shown in FIG. 4. The binary voltage output of the amplifier quantizer circuit 22 is coupled to the amplifier 100 through resistor 104. Capacitors 110 and 112 are used to bypass any extraneous interference which would otherwise contaminate $E_o$. A potentiometer 108 applies a DC bias voltage to the operational amplifier. The potentiometer 108 can be used to adjust the integrator circuit output signal, coupled through resistor 102 to the quantizer circuit 22, so that the meter scale of the DC voltage meter 28 can be calibrated to register an SNR reading of minus infinity, when the sample-and-hold circuit 24 is clocked at a time during which no information signal component occurs.

Figure 5:
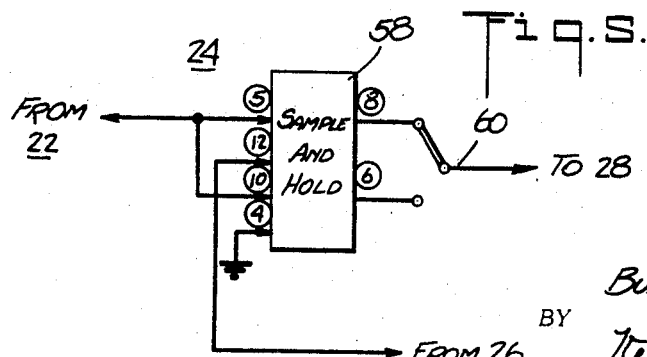

The output of the amplitude quantizer circuit 22 is connected to a sample-and-hold circuit 24, that can include a bi-stable multi-vibrator (FIG. 5). The sample-and-hold circuit 24 assumes the state of the amplitude quantizer circuit output (wave form C) when it is clocked by the sampling signal (wave form E). The sample-and-hold circuit 24 keeps this assumed state until the occurrence of the next sampling signal. Circuit 24 then assumes the state of the quantizer circuit 22 output, at that time.

The sample-and-hold circuit can comprise an integrated circuit semi-conductor device 58 (FIG. 5). The output of amplitude quantizer circuit 22 is coupled to terminals 5 and 10 of device 58. The sampling signal is applied to terminal 12. An output of either positive or negative polarity is obtained from device 58 at terminals 6 and 8.

The switch 60 is used to couple either terminal 6 or 8 to the DC voltmeter circuit 28. An integrated circuit semiconductor device suitable for use as device 58 in FIG. 5 is Type SN7470 (Texas Instruments, Inc.).

The sampling signals (wave forms A and E) are obtained from the variable trigger delay circuit 26 upon application of a synchronizing trigger pulse TP to the input terminals 116, 118 thereof. The trigger pulse frequency (wave form TP) is selected to be substantially equal to the frequency of the information signal component (B'), although advanced in time with respect thereto.

One embodiment of a variable trigger delay circuit is shown in FIG. 7. Positive polarity or negative polarity synchronizing trigger pulses are applied to input terminals 116, 118 respectively. The positive polarity trigger pulse is coupled to a first inverter circuit 122 by means of a waveform shaping network 134 which includes capacitor 138, resistors 140 and 142, waveform clipping diodes 144 and 146, and a second inverter circuit 136. The negative polarity trigger pulse is coupled to the first inverter circuit 122 through a second waveform shaping network 120 which includes capacitor 124, resistors 126 and 128, and waveform clipping diodes 130 and 132.

Figure 6:
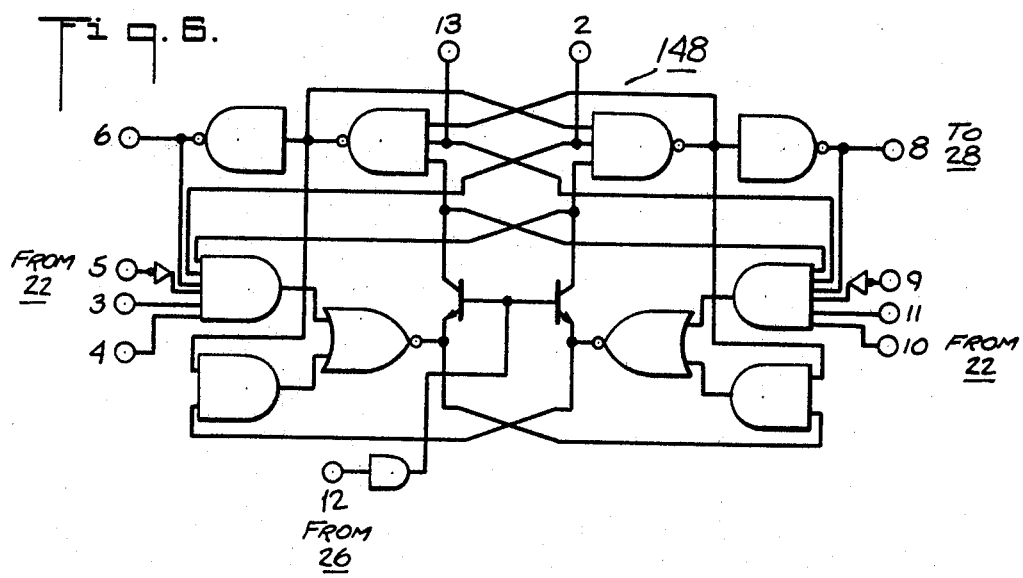
FIGS. 5 and 6 show in block diagram form an integrated circuit semi-conductor device including a flipflop circuit which comprises a portion of the sample-and-hold network which is incorporated in the electrical apparatus of FIG. 1.

The amplitude-shaped synchronizing trigger pulses are coupled from the first inverter circuit 122 to terminal 12 of an integrated circuit semiconductor device 148, that is of the kind shown in FIG. 6.

The variable trigger delay circuit 26, also includes a differential amplifier comprising transistors 152 and 154 and resistors 156, 160, and 162. Resistor 162 is a potentiometer used in connection with capacitor 158 to set the base electrode of transistor 154 at some positive potential representative of a predetermined time delay to be imparted to the synchronizing trigger pulses. A time delay of up to 100 microseconds can be obtained, for example, with a 2.5K ohm potentiometer.

In the absence of a synchronizing trigger pulse (waveform A), transistor 164 conducts at saturation. As a result the voltage at the base electrode of transistor 152 is slightly positive, equal to the DC power supply voltage divided through resistors 168 and 166. The potentiometer 162 must be set to a more positive potential in order to achieve a trigger delay. Consequently, transistor 152 is conducting and transistor 154 is cut-off.

When a synchronizing trigger pulse (waveform A) is applied to input terminal 116 or 118, an output transition is developed at terminal 6 of the semiconductor device 148. At the same time an output transition is developed at terminal 8 of integrated circuit 148 to saturate a third inverter circuit 210, that is coupled through resistor 212 to the base electrode of transistor 176; minority carriers stored in the base-collector junction, thereof, are removed through the conducting path thereby established, after the delay interval.

The output transition at terminal 6 is coupled through a resistor-capacitor network 172, 174 to the base electrode of transistor 164, thereby cutting it off; capacitor 170 begins to charge up through the resistor 168 and ultimately exceeds the potential set by potentiometer 162; at this point the action of the differential amplifier is such as to cut-off transistor 152 and cause transistor 154 to conduct.

This transition, which occurs at a time determined by the setting of potentiometer 162, is amplified by a three stage high gain amplifier network, comprising transistors 176, 178, 186, resistors 180, 182, 190, and capacitor 184. The amplified transition produces the leading edge of each pulse in the sampling signal (waveform E), that appears at terminal 150.

The signal at the collector electrode of transistor 186 is coupled to a marker-out amplifier comprising transistor 188, resistors 192, 194 and a coupling network including resistors 196, 198 and capacitors 200. The signal developed by the marker-out amplifier can be coupled from terminal 202 to a display device, for example, an oscilloscope.

Furthermore, the output of the marker-out amplifier can be coupled to a delay network including a diode 206, and a capacitor 208 in order to derive a signal used to reset the device 148 after the trigger delay interval.

Thus the output voltage at terminal 6 is removed and transistor 164 is turned on. Consequently, transistor 152 is turned on; the change in voltage at the collector electrode of this transistor is coupled through the high gain amplifier network to produce the trailing edge of each pulse in the sampling signal (waveform E) appearing at terminal 150.

The inverter circuits 122, 136, 206, 210, hereinbefore described are of conventional construction and can be separate circuits or included in an integrated circuit semiconductor device (FIG. 9), for example, Type SN7400 (Texas Instrument Inc.)

As hereinbefore described, the signal sampling signal (waveform E) at terminal 150 of the variable trigger delay circuit 26 is used to clock the sample-and-hold circuit 24. By adjustment of potentiometer 162, circuit 24 is clocked at the time occurrence of the information signal B'. The actual sampling instant of circuit 24 is at the leading edge of the delayed trigger.

The output of the sample-and-hold circuit 24 (waveform F) is coupled to a DC voltmeter circuit 28, that can be of conventional construction, or alternatively, as shown in FIG. 8.

Referring to FIG. 8, the output of circuit 24 is coupled through resistor 64 to a buffer amplifier including transistor 62 and power supply resistor 66. The buffer amplifier output signal is coupled to a smoothing network including strapping resistors 68, 70, 72, 74, and capacitor 76.

The smoother signal is coupled to an emitter-follower amplifier including a transistor amplifier 78 having a high input impedance. A feed-back amplifier including transistor 80 and resistors 82, 84, 86, 88, is used to adjust the gain of amplifier 78 to a value that very closely approximates unity. The output of the emitter follower is coupled to an ammeter 96, through current limiting and zero adjust resistors 92, 94. The meter scale is calibrated to provide SNR readings in response to the current output of the emitter follower. Alternatively, a voltmeter and suitable zero adjust resistors can be used.

The DC voltmeter 28 can be replaced by switching in a conventional pulse counter $28_a$. In this embodiment, the sample-and-hold circuit 24 output (wave form F), obtained by clocking the circuit 24 with sampling pulses, (waveform E), is counted during an interval of time substantially greater than the period of the information signal component. The pulse counts so derived are substantially equal to the probabilities $P_a$ and $P_d$, respectively. These probabilities can be correlated, by means of the statistical functions that describe the time characteristics of the detected waveform, to determine the SNR.

In the method of measuring the ratio of signal power to noise power of an electrical waveform, the waveform is supplied to an amplitude quantizer to derive a signal having a first and second level. A threshold level intermediate the first and second levels is selected. Then the amplitude quantized signal is sampled, first at the time occurrence of the signal and then at the time occurrence of noise alone. The output signal obtained by the first sampling is averaged over a period of time substantially greater than the sampling signal period; this average value so obtained is a measure of $P_d$.

Then the output signal obtained by the second sampling is also average over the same period; this second average value is a measure of $P_a$.

The measured values of $P_d$ and $P_a$ can be correlated to the statistical functions described above, by means of the Marcum tables or by analytical techniques to derive the SNR.

Alternatively, the output signals derived from the first and second samplings can each be counted by a pulse counting indicator such as an Eputmeter indicator, for example, so to obtain direct readings of $P_d$ and $P_a$ respectively.

Furthermore, a voltmeter circuit can be used in place of the counter to obtain direct readings of $P_d$ and $P_a$ respectively.

In addition, the selected threshold level can be regulated to remain at a fixed value that is representative of a specific value of $P_a$. In this case, only $P_d$ need be measured and if a voltmeter circuit is used, the meter scale can be calibrated to display SNR readings directly.

Moreover, although the particular embodiments of the invention have been described with reference to SNR measurements of radar echos immersed in Gaussian white noise, it is obvious that the methods and apparatus of the invention can be used to measure the SNR of other detected waveforms, that have known statistical characteristics. Examples of such waveforms are a D-C signal or a sinusoidal signal immersed in Gaussian white noise, as well as a periodic non-sinusoidal signal immersed in noise.

Furthermore, the waveform whose signal power to noise power ratio is to be measured can be a simulated radar echo (for the purpose of evaluating the transmission characteristics of a radar receiver), a tele-communications signal intercepted by a receiver, a simulated telecommunications signal, and the like.

What is claimed is:

1. The method of measuring the ratio of signal power to noise power of an electrical wave form containing a signal component and a noise component in terms of the functions that describe the wave form comprising the steps of:
   (a) selecting a threshold level intermediate the peak amplitude excursions of the wave form;
   (b) measuring the time rate at which the noise component alone of the wave form exceeds the threshold level;
   (c) additionally measuring the time rate at which the signal component of the wave form superposed on the noise component exceeds the threshold level; and
   (d) correlating the measured time rates of the noise component and the signal component to the known statistical characteristics of the wave form whereby the resulting correlation determines the ratio of signal power to noise power.

2. The method of measuring the ratio of signal power to noise power of an electrical wave form in terms of the known statistical characteristics of the wave form in accordance with claim 1 and further comprising the step of:
   adjusting the threshold level after the step of measuring the time rate at which the noise component exceeds the threshold level in order to maintain the measured noise time rate constant
   whereby the adjusted threshold level is present during the step of additionally measuring the time rate at which the signal component of the wave form superposed on the noise component exceeds the threshold level.

3. The method of measuring the ratio of signal power to noise power of an electrical wave form in terms of the known statistical characteristics of the wave form in accordance with claim 1:
   (a) in which the step of measuring the time rate at which the noise component exceeds the threshold level comprises
      sampling the amplitude of the detected wave form at a rate substantially equal to the frequency of the signal but out of time phase with respect thereto for a period of time substantially greater than the period of the signal in order to measure the time rate at which the noise component, alone, of the wave form exceeds the threshold level during the sampling period; and (b) in which the step of additionally measuring the time rate at which the signal component of the wave form superposed on the noise component exceeds the threshold level comprises additionally sampling the amplitude of the wave form at a rate substantially equal to the frequency of the signal and in phase with respect thereto for a period of time substantially greater than the period of the signal in order to measure the time rate at which the signal superposed on the noise component exceeds the threshold level during the sampling period.

4. The method of measuring the ratio of signal power to noise power of an electrical wave form in terms of the known statistical characteristics of the wave form in accordance with claim 3 additionally comprising the step of:

adjusting the threshold level thereby to maintain the measured noise time rate constant.

5. Apparatus for measuring the ratio of signal power to noise power of a detected electrical wave form in terms of known statistical characteristics of the wave form comprising:

first means for supplying the wave form;

second means for supplying a sampling signal having a frequency substantially equal to the frequency of the signal component of the wave form, said second means including means for varying the time phase of the sampling signal with respect to the time phase of the signal component;

means, responsive to the amplitude variations of the wave form, for deriving a signal representative of the time rate at which the amplitude of the wave form exceeds a predetermined threshold level; and means, responsive to the derived signal and to the sampling signal, that is out of time phase with respect to the signal component, as well as to the derived signal and to the sampling signal that is in time synchronism with the signal component, for measuring, respectively, the time rate at which the noise component of the wave form exceeds the threshold level and additionally the time rate at which the signal component, superposed on the noise component, exceeds the threshold level.

6. Apparatus for measuring the ratio of signal power to noise power of a detected electrical wave form in terms of the known statistical characteristics of the wave form comprising:

first means for supplying the wave form;

second means for supplying a first sampling signal in time synchronism with the signal component of the wave form and for supplying a second sampling signal delayed in time with respect to the first sampling signal;

means, responsive to the amplitude variations of the supplied wave form, for deriving a signal representative of the time rate at which the amplitude of the supplied wave form exceeds a predetermined threshold level;

and means, responsive to the derived signal and the first sample signal as well as responsive to the derived signal and the second sampling signal, for measuring respectively the time rate at which the signal component, superposed on the noise component of the wave form, exceeds the threshold level and the time rate at which the noise component, alone, exceeds the threshold level.

7. The apparatus according to claim 6 wherein the measuring means includes circuit means, responsive to the first and second sampling signals, for developing respectively first and second signals representative of the amplitude of the derived signal at the time of response; and means for evaluating the first and second developed signals, during a period of time substantially greater than the period of the information signal component thereby to measure the time rates.

8. Apparatus according to claim 7 wherein said evaluating means comprises means for counting the pulses occuring in the first and second developed signals respectively during a period of time substantially greater than the period of the information signal complement.

9. Apparatus for measuring the ratio of signal power to noise power of a detected electrical wave form in terms of the known statistical characteristics of the wave form, comprising:

first means for supplying the detected wave form;

second means for supplying a sampling signal synchronous in time with the signal component of the wave form;

means, responsive to the amplitude variations of the supplied wave form, for deriving a signal representative of the time rate at which the amplitude of the wave form exceeds a predetermined threshold level;

means, responsive to the derived signal, for adjusting the threshold level thereby to maintain the threshold level proportional to the average value of the derived signal;

means, responsive to the derived signal and to the sampling signal, for developing a signal representative of the amplitude of the derived signal at the time of occurrence of the sampling signal, the average value of the developed signal, during a period of time substantially greater than the period of the signal component of the detected wave form, being proportional to the ratio of signal power to noise power of the detected wave form.

10. Apparatus for measuring the ratio of signal power to noise power of a detected electrical wave form in terms of the known statistical characteristics of the wave form according to claim 9, further comprising:

circuit means responsive to the developed signal for producing an output signal proportional to the average value of the developed signal during a period of time substantially greater than the period of the information signal component; and means, including a meter circuit, for converting the output signal to a quantitative measurement of the ratio of information signal power to noise power in the detected electrical wave form.

11. Apparatus according to claim 10 in which said meter circuit includes electromechanical meter means; and emitter follower means for coupling the output signal to said meter means, said emitter follower means having negative feed-back apparatus including an electron device for regulating the amplification of said emitter follower means.

References Cited

UNITED STATES PATENTS

| | | | |
|---|---|---|---|
| 2,866,090 | 12/1958 | Sherr | 325—363 |
| 2,959,672 | 11/1960 | Haise | 325—363 |
| 3,287,646 | 11/1966 | Taylor | 324—140 XR |
| 3,302,116 | 1/1967 | Free. | |

RUDOLPH V. ROLINEC, Primary Examiner

A. E. SMITH, Assistant Examiner

U.S. Cl. X.R.

324—57; 325—363